United States Patent
Zimmermann et al.

(10) Patent No.: US 12,084,107 B2
(45) Date of Patent: Sep. 10, 2024

(54) METHOD FOR ASCERTAINING A SPATIAL ORIENTATION OF A TRAILER

(71) Applicant: Robert Bosch GmbH, Stuttgart (DE)

(72) Inventors: Eva Zimmermann, Reutlingen (DE);
Benjamin Classen, Weinsberg (DE);
Robert Herzig, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 172 days.

(21) Appl. No.: 17/668,552

(22) Filed: Feb. 10, 2022

(65) Prior Publication Data

US 2022/0258800 A1    Aug. 18, 2022

(30) Foreign Application Priority Data

Feb. 17, 2021   (DE) ..................... 10 2021 201 525.5

(51) Int. Cl.

| | |
|---|---|
| *B62D 13/06* | (2006.01) |
| *B60R 1/26* | (2022.01) |
| *B60R 11/04* | (2006.01) |
| *B62D 15/02* | (2006.01) |
| *G06V 10/44* | (2022.01) |

(Continued)

(52) U.S. Cl.
CPC ............... *B62D 13/06* (2013.01); *B60R 1/26* (2022.01); *B60R 11/04* (2013.01); *G06V 10/44* (2022.01); *G06V 10/82* (2022.01); *G06V 20/56* (2022.01); *B60R 2300/105* (2013.01);
(Continued)

(58) Field of Classification Search
CPC ...... B62D 13/06; B62D 15/021; B62D 13/00; B62D 15/025; B60R 1/26; B60R 11/04; B60R 2300/105; B60R 2300/107; B60R 2300/808; B60R 1/002; G06V 10/44; G06V 10/82; G06V 20/56; B60Y 2300/28; B60D 1/62; G06T 7/73; G06T 2207/10012;
(Continued)

(56) References Cited

U.S. PATENT DOCUMENTS

| | | | |
|---|---|---|---|
| 7,904,222 B2 * | 3/2011 | Lee ........................ | G08G 1/167 701/41 |
| 9,037,349 B2 * | 5/2015 | Trombley ............ | B62D 15/027 701/41 |

(Continued)

FOREIGN PATENT DOCUMENTS

| | | |
|---|---|---|
| DE | 102010008324 A1 | 8/2011 |
| DE | 102017223098 A1 | 6/2019 |

(Continued)

*Primary Examiner* — Sizo B Vilakazi
*Assistant Examiner* — Brian R Kirby
(74) *Attorney, Agent, or Firm* — NORTON ROSE FULBRIGHT US LLP; Gerard A. Messina

(57) ABSTRACT

A method for ascertaining a spatial orientation of a trailer of an autonomously driving towing vehicle with trailer. The method includes the steps of reading in image data of at least one rear-facing camera, assigning image points of the image data to the trailer or to the vehicle surrounding environment, ascertaining a rear trailer edge or at least one point of the rear trailer contour from the image points assigned to the trailer, and determining the trailer angle as a function of image coordinates of the trailer edge or of the point, the dimensions of the trailer, and the position of the camera relative to the support point of the trailer.

11 Claims, 2 Drawing Sheets

(51) Int. Cl.
*G06V 10/82* (2022.01)
*G06V 20/56* (2022.01)

(52) U.S. Cl.
CPC ... *B60R 2300/107* (2013.01); *B60R 2300/808* (2013.01); *B62D 15/021* (2013.01)

(58) Field of Classification Search
CPC . G06T 2207/20081; G06T 2207/20084; G06T 2207/30252; G06T 7/70; G06N 20/00
USPC .......................................................... 701/41
See application file for complete search history.

(56) References Cited

U.S. PATENT DOCUMENTS

| | | | | |
|---|---|---|---|---|
| 9,085,261 | B2* | 7/2015 | Lu | B60Q 9/005 |
| 9,610,975 | B1* | 4/2017 | Hu | B60D 1/06 |
| 10,140,525 | B2* | 11/2018 | Lang | G08G 1/167 |
| 11,048,962 | B2* | 6/2021 | Jähnisch | H04N 9/793 |
| 2008/0044061 | A1* | 2/2008 | Hongo | B60R 1/23 |
| | | | | 382/104 |
| 2009/0005932 | A1* | 1/2009 | Lee | G01S 13/862 |
| | | | | 701/41 |
| 2009/0271078 | A1* | 10/2009 | Dickinson | G06V 10/255 |
| | | | | 701/51 |
| 2010/0171828 | A1* | 7/2010 | Ishii | B62D 13/06 |
| | | | | 348/135 |
| 2011/0050903 | A1* | 3/2011 | Vorobiev | B60D 1/245 |
| | | | | 348/148 |
| 2013/0158803 | A1* | 6/2013 | Headley | B62D 13/06 |
| | | | | 701/41 |
| 2014/0085472 | A1* | 3/2014 | Lu | B60R 1/28 |
| | | | | 348/148 |
| 2014/0160276 | A1* | 6/2014 | Pliefke | H04N 5/272 |
| | | | | 348/118 |
| 2014/0200759 | A1* | 7/2014 | Lu | G06T 7/73 |
| | | | | 701/28 |
| 2014/0309888 | A1* | 10/2014 | Smit | B60W 30/045 |
| | | | | 701/41 |
| 2015/0344067 | A1* | 12/2015 | Lavoie | B62D 13/06 |
| | | | | 701/41 |
| 2016/0129939 | A1* | 5/2016 | Singh | B62D 13/06 |
| | | | | 701/41 |
| 2018/0057052 | A1* | 3/2018 | Dodd | G01D 5/16 |
| 2018/0068447 | A1* | 3/2018 | Prasad | G06T 7/246 |
| 2018/0276839 | A1* | 9/2018 | Diessner | G06T 7/73 |
| 2018/0365509 | A1* | 12/2018 | Naserian | G06V 10/25 |
| 2020/0285913 | A1* | 9/2020 | Gavrilovic | G06N 3/088 |
| 2020/0346581 | A1* | 11/2020 | Lawson | B60R 1/0612 |
| 2021/0166051 | A1* | 6/2021 | Jähnisch | H04N 23/71 |
| 2022/0222850 | A1* | 7/2022 | Turner | G06T 7/248 |

FOREIGN PATENT DOCUMENTS

| | | | | |
|---|---|---|---|---|
| DE | 102018219829 A1 * | 5/2020 | | |
| DE | 102019131702 A1 | 5/2020 | | |
| DE | 102019005932 A1 | 2/2021 | | |
| WO | 2016025120 A1 | 2/2016 | | |
| WO | WO-2018202762 A1 * | 11/2018 | ............ | B60D 1/145 |
| WO | WO-2019110156 A1 * | 6/2019 | | |
| WO | WO-2019202317 A1 * | 10/2019 | | |
| WO | 2021007427 A1 | 1/2021 | | |

\* cited by examiner

METHOD FOR ASCERTAINING A SPATIAL ORIENTATION OF A TRAILER

FIELD

The present invention relates to a method for ascertaining a spatial orientation of a trailer of an autonomously driving towing vehicle with trailer. In addition, the present invention relates to a device for carrying out such a method.

BACKGROUND INFORMATION

In autonomously driving vehicles, in particular towing vehicles with trailers, it is important to acquire the state of the trailer in order to gain knowledge of its angle relative to the towing vehicle, its position, its speed, its dimensions, etc. The acquisition of the state of the trailer is used for many purposes. On the one hand, knowledge of the state of the trailer is indispensable for planning collision-free, safe trajectories of the truck-trailer unit. On the other hand, it is also important to improve the performance of the overall object recognition and tracking.

PCT Patent Application No. WO 2016/025120 A1 describes a method and a device for determining an angle of articulation of an articulated vehicle. To determine the angle, a camera that monitors the trailer is situated on a towing vehicle. From the images recorded by the camera, a parameter is acquired, such as a lower edge of the trailer. This parameter is converted into a geometric model and determines the angle by which the parameter deviates from the zero position.

SUMMARY

An object of the present invention is to provide a method for ascertaining a spatial orientation of a trailer of an autonomously driving towing vehicle with trailer, with which a reliable and economical determination of the orientation of various trailer types is possible.

In order to achieve the object, a method for ascertaining a spatial orientation of a trailer in accordance with the present invention is provided. Advantageous developments of the present invention are disclosed herein.

In accordance with the present invention, a method is provided for ascertaining a spatial orientation of a trailer of an autonomously driving towing vehicle with trailer. In accordance with an example embodiment of the present invention, the method includes the steps of reading in image data of at least one rear-facing camera, assigning image points of the image data to the trailer or to the vehicle surrounding environment, ascertaining a rear trailer edge or at least one point of the rear trailer contour from the image points assigned to the trailer, and determining the trailer angle as a function of image coordinates of the trailer edge or of the point, the dimensions of the trailer, and the position of the camera relative to the support point of the trailer.

In the sense of the present invention, image data are understood as images recorded by a camera situated on the towing vehicle. This camera is oriented in such a way that at least a rear end of the trailer is visible to the camera in at least one curve. The multiplicity of image points that each image is made up of are assigned to the trailer or to the vehicle surrounding environment. In the case of a box-shaped trailer, the rear trailer edge is understood to be an edge at which the trailer ends in the image and after which there follow image points of the vehicle surrounding environment. Preferably, the rear trailer edge is a vertical edge of the trailer.

In the case of an undefined geometric shape, such as in the case of a tank trailer, instead of a trailer edge only a point of the rear trailer contour is used. The trailer angle describes an angle by which the trailer is pivoted relative to a longitudinal axis of the towing vehicle. Image coordinates are understood to be the coordinates in this image assigned to each image point of the image. The dimensions of the trailer are defined by the length, width, and height of the trailer. Preferably, the dimensions of the trailer are known. For the calculation of the trailer angle, in addition the position of the camera, i.e. its lateral and longitudinal distance from the support point, is required. Preferably, the properties of the camera, such as the focal length, are also known.

In accordance with an example embodiment of the present invention, in this method, the camera is preferably a camera that is already used for autonomous driving. The method thus has the advantage that no additional hardware, such as an angle sensor, has to be situated at the support point in order to detect the trailer angle. The trailer angle is thus substantially ascertained through the position, changing in the image, of the trailer edge or of the point. Due to the automatic ascertaining of the trailer edge or of the point, markings identifying a point or an edge are not required. As a result, the trailer can be exchanged without additional effort, as is standard in freight traffic. The method thus increases the economic efficiency of such a towing vehicle with trailer.

Preferably, in accordance with an example embodiment of the present invention, the method is carried out simultaneously by two cameras situated on the towing vehicle, opposite the longitudinal axis. This has the advantage that the trailer angles ascertained in the respective curves can be compared with one another, so that a plausibility check of these values can be carried out. Also, in this way the trailer angle can continue to be calculated when there is a failure of one of the cameras.

In a preferred example embodiment of the present invention, the assignment of the image points is carried out using a machine learning model that has been trained on the assignment of the image points to the trailer. Using such a machine learning model, the image points can easily be assigned to the trailer. The machine learning model is in addition further trained during operation. Preferably, this machine learning model is a neural network trained using a deep learning method.

In a further preferred embodiment of the present invention, the ascertaining of the rear trailer edge or of the point is determined using a machine learning model. In this way, the trailer edge or the point can also easily be recognized for various different trailers.

Preferably, an image processing algorithm is used to ascertain the rear trailer edge or the point. On the basis of the image processing algorithm, the images are analyzed in order to ascertain the trailer edge or the point. With the use of an image algorithm, a training step that is required for a machine learning model can be saved. As the image processing algorithm, known algorithms, such as the optical flow approach or classical computer vision approaches, can be used here. In this way, it is possible to easily ascertain the trailer edge or the point of the trailer contour.

In an advantageous development of the present invention, the ascertaining of the rear trailer edge or of the point and the distance thereto is determined using a disparity ascertained by a stereo camera. Using a stereo camera, two images are produced, so that a spatial view is possible. The distance to the trailer edge can be ascertained via the disparity produced by the stereo camera. In this way, it is also possible to ascertain the dimensions of the trailer. In this way, different trailers can be used whose dimensions are not known at the beginning of the trip. As a result, the driver does not have to input data about the trailer dimensions. This simplifies the method and makes it possible to carry it out at low cost.

Advantageously, the trailer angle is calculated on the basis of geometric and trigonometric relations between the image coordinates, the position of the camera relative to the support point of the trailer, and the dimension of the trailer. The trailer angle can in this way be ascertained using simple calculations, so that the trailer angle can be calculated quickly. Preferably, for the calculation the properties of the camera, such as the focal length, are known.

In a further advantageous embodiment of the present invention, the trailer angle is determined on the basis of a lower point of the trailer edge or an outermost point of the rear trailer contour. Here the lowest point is the point that is situated at the bottom on the vertical trailer axis. In curves, this point has the advantage that a deviation of the trailer angle due to rolling of the trailer is minimal. Correspondingly, in this way the accuracy of the method and thus of the angle, or the spatial orientation, can be increased.

Preferably, a roll angle of the trailer is determined on the basis of a horizontal deviation between a lower and an upper point of the trailer edge. In this way, the roll angle can be simultaneously calculated by the method for ascertaining the spatial orientation. This can be evaluated with regard to a critical value for tipping. In this way, the safety of the autonomous system can be improved.

According to a useful example embodiment, based on the trailer angle the longitudinal and lateral position of the trailer edge or of the point relative to the support point of the trailer or of the camera is determined. In this way, the spatial orientation of the trailer, which is important for autonomous driving, can be ascertained.

According to a further useful embodiment, the dimensions of the trailer are ascertained via sensors of the towing vehicle with trailer. These sensors are for example radar, lidar, ladar, or optical sensors already used for autonomous driving. In this way, no additional sensors are required to ascertain the dimensions of the trailer. As a result, the method can be carried out at low cost. Also, it is possible to couple trailers having different dimensions to the towing vehicle.

The object of the present invention may also be achieved by a device for carrying out the method according to the present invention. The device includes at least two rear-facing cameras for acquiring image data and a processing unit for ascertaining a rear trailer edge or at least one point of the rear trailer contour, as well as for ascertaining the trailer angle as a function of image coordinates of the trailer edge or of the point, the dimensions of the trailer, and the position of the camera relative to the support point of the trailer. With such a device, the advantages cited in relation to the method can be achieved.

Exemplary embodiments of the present invention are shown in the figures and/or are explained in more detail in the following description.

DETAILED DESCRIPTION OF EXAMPLE EMBODIMENTS

Figure 1:
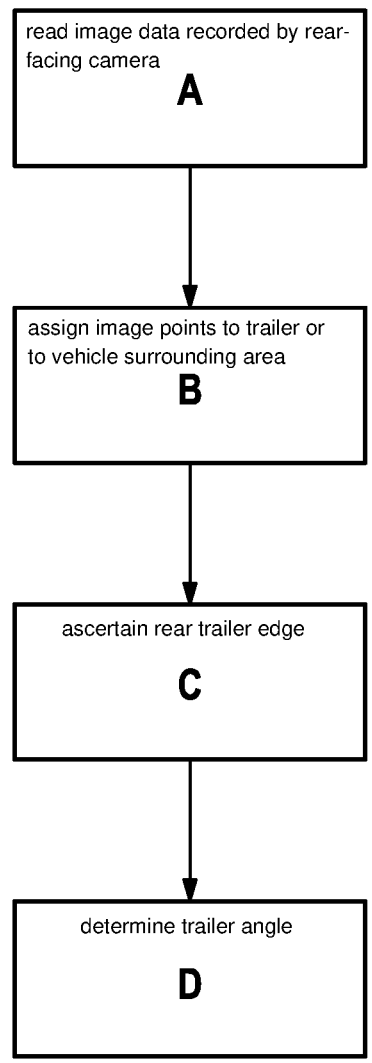
FIG. 1 shows an exemplary embodiment of a method according to the present invention for ascertaining the spatial orientation of a trailer.
Figure 2:
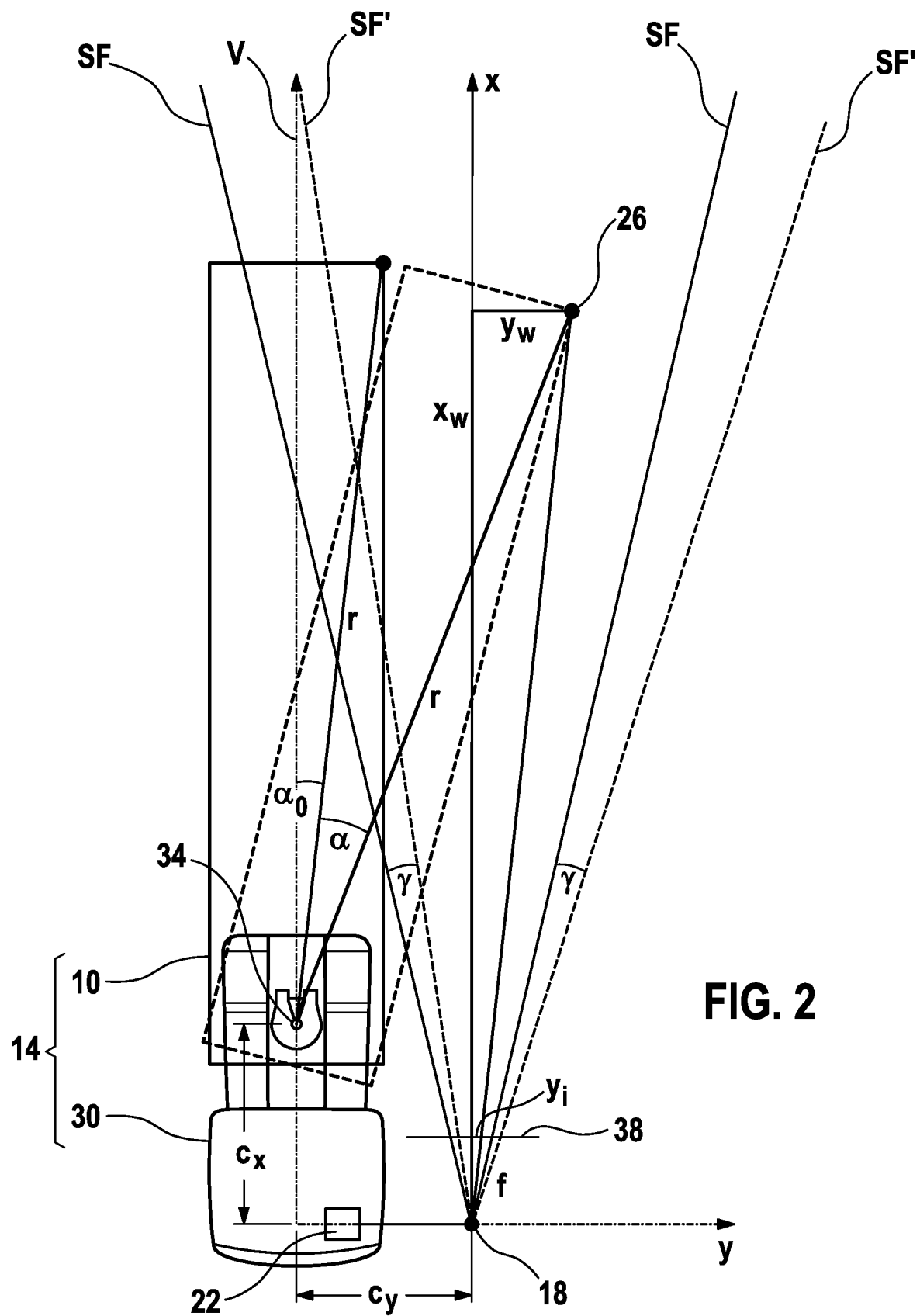
FIG. 2 shows an exemplary embodiment for ascertaining the trailer angle, in accordance with the present invention.

FIG. 1 shows an exemplary embodiment of a method according to the present invention for ascertaining the spatial orientation of a trailer 10 (see also FIG. 2). Trailer 10 is in particular a trailer 10 of an autonomously driving towing vehicle with trailer 14. For the autonomous driving functions, this vehicle-trailer unit is as a rule equipped with a multiplicity of sensors such as, inter alia, cameras 18. These are also used in this method for ascertaining the spatial orientation of trailer 10, so that no additional cameras 18 are required.

In a first step A, the image data recorded by a rear-facing camera 18 (see FIG. 2) are read into a processing unit 22. These image data here contain at least one rear part of trailer 10. In the processing unit, in a next step B the image points are assigned to trailer 10 or to the vehicle surrounding environment. This assignment can be carried out for example via a machine learning model that, on the basis of training data, has learned to distinguish the trailer from the vehicle surrounding environment. In this way, trailer 10 is recognized in the image data.

In a next step C, on the basis of trailer 10 recognized in this way, a rear trailer edge 26 is ascertained. For this purpose, the image points of trailer 10 are inputted into a machine learning model that, based on the training, recognizes rear trailer edge 26. It is also possible to use only a point of rear trailer edge 26 for the further method. In particular, for this purpose a point 26 is used that is situated in a lower region of trailer edge 26. Such a point 26 has the advantage that a rolling movement of trailer 10, caused by a curve, will have only a small influence on trailer angle $\alpha$.

In a further step D, the trailer angle $\alpha$ is determined. For this step, if the dimensions of trailer 10 are not already stored then they have to be determined ahead of time. The determining of the dimensions only has to be carried out at the beginning of the trip. This can be ascertained for example using a radar sensor installed in the towing vehicle with trailer 14.

FIG. 2 shows an exemplary embodiment for ascertaining the trailer angle $\alpha$. This Figure shows a plan view of a towing vehicle with trailer 14 in which trailer angle $\alpha$ is 0° and in which trailer 10 is turned (broken lines). In this exemplary embodiment, camera 18 is situated on a left external mirror of towing vehicle 30. In addition, a left rear trailer edge or point 26 is shown. A radius r between this point 26 and a point of rotation, here formed by a support point 34, results from the trailer width and a trailer length going out from support point 34. From these values, there results an angle $\alpha_0$ between diagonal r and a vehicle longitudinal axis v.

The lines SF show a field of view of camera 18 in an optimally oriented position. In contrast, lines SF' show a field of view of a camera 18 that is displaced from the optimal position by a correction angle $\gamma$. This correction angle $\gamma$ has to be taken into account in the calculation as a correction, because a center axis x of camera 18 is also displaced by this angle. Here, the point distance $x_w$ represents the distance of point 26 from camera 18 along center axis x. This value is calculated according to $x_w = r \cdot \cos(\alpha + \alpha_0) + c_x$. Because the calculation of the values $\alpha$, $\alpha_0$, r is calculated starting from support point 34, for the calculation of the point distance $x_w$ the camera distance $c_x$ between support point 34 and camera 18 also has to be added. Likewise, the point distance $y_w$ represents the distance of the point from camera 18 along transverse axis y. This value is calculated according to $y_w = r \cdot \sin(\alpha+\alpha_0) - c_y$. Here, the camera distance $c_y$, which corresponds to the distance between support point 34 and camera 18, has to be subtracted.

An image of trailer 10 is recorded in camera 18 on an image plane 38 formed for example by an image sensor. For clearer illustration, the image plane 38 in front of camera 18 is shown. The value $y_i$ here describes the image distance between center axis x and point 26 of trailer edge 26 on image plane 38. The image distance $y_i$ can be determined. The image distance $y_i$ for focal length f here behaves in the same way as the point distance $y_w$ relative to $x_w$. In this way, including the correction angle γ, the following results:

$$\frac{y_i}{f} = \frac{-\sin(\gamma)x_w + \cos(\gamma)y_w}{\cos(\gamma)x_w + \sin(\gamma)y_w}$$

If the equations for $x_w$ and $y_w$ are substituted in this equation, the following results:

$$\frac{y_i}{f} = \frac{-\sin(\gamma)(r\cos(\alpha + \alpha_0) + c_x) + \cos(\gamma)(r\sin(\alpha + \alpha_0) - c_y)}{\cos(\gamma)(r\cos(\alpha + \alpha_0) + c_x) + \sin(\gamma)(r\sin(\alpha + \alpha_0) - c_y)}$$

If this equation is solved for trailer angle α, then trailer angle α can be ascertained on the basis of the image on camera 18, the dimensions of trailer 10, and the position of camera 18 relative to support point 34. By substituting the trailer angle α determined in this way in the equations for $x_w$ and $y_w$, the longitudinal and lateral position of point 26 of trailer edge 26 can then also be determined.

What is claimed is:

1. A method for ascertaining a spatial orientation of a trailer of an autonomously driving towing vehicle with trailer, the method comprising:
   reading, via a processing unit, in image data of at least one rear-facing camera, wherein the at least one rear-facing camera includes a camera mounted on an external mirror of the towing vehicle, and wherein a field of view of the camera is displaced from an optimal position by a correction angle;
   assigning, via the processing unit, image points of the image data to the trailer or to the vehicle surrounding environment;
   ascertaining, via the processing unit, a rear trailer edge or at least one point of a rear trailer contour, from the image points assigned to the trailer;
   determining, via the processing unit, a trailer angle as a function of the correction angle, image coordinates of the trailer edge or of the point, dimensions of the trailer, and a position of the camera relative to a support point of the trailer; and
   autonomously driving the towing vehicle with the trailer based on the trailer angle;
   wherein the position of the camera includes a lateral distance and a longitudinal distance from the support point, and
   wherein the trailer angle is determined based on a value $y_i$, which is an image distance between a center axis x and a point of the trailer edge on an image plane, and a focal length f of the camera.

2. The method as recited in claim 1, wherein a machine learning model that was trained on the assignment of the image points to the trailer carries out the assignment of the image points.

3. The method as recited in claim 1, wherein a machine learning model ascertains the rear trailer edge or the point.

4. The method as recited in claim 1, wherein an image processing model ascertains the rear trailer edge or the point.

5. The method as recited in claim 1, wherein a stereo camera ascertaining a disparity determines the ascertained rear trailer edge or the point.

6. The method as recited in claim 1, wherein the trailer angle is calculated based on geometric and trigonometric relations between the image coordinates, the position of the camera relative to the support point of the trailer, and the dimension of the trailer.

7. The method as recited in claim 1, wherein the trailer angle is determined based on a lower point of the rear trailer edge or an outermost point of the rear trailer contour.

8. The method as recited in claim 1, wherein a longitudinal and lateral position of the trailer edge or of the point, relative to the support point of the trailer or of the camera, is determined based on the trailer angle.

9. The method as recited in claim 1, wherein dimensions of the trailer are ascertained via sensors of the towing vehicle with trailer.

10. A device, comprising:
    at least two rear-facing cameras configured to acquire image data, wherein the at least two rear-facing cameras includes a camera mounted on an external mirror of an autonomously driving towing vehicle, and wherein a field of view of the camera is displaced from an optimal position by a correction angle; and
    a processing unit configured to ascertain a spatial orientation of a trailer of the autonomously driving towing vehicle;
    wherein the processing unit is configured to ascertain a rear trailer edge or at least one point of a rear trailer contour, and to ascertain a trailer angle as a function of the correction angle, image coordinates of the trailer edge or of the point, dimensions of the trailer, and a position of the camera relative to a support point of the angle;
    wherein the position of the camera includes a lateral distance and a longitudinal distance from the support point, and
    wherein the trailer angle is determined based on a value $y_i$, which is an image distance between a center axis x and a point of the trailer edge on an image plane, and a focal length f of the camera.

11. The method as recited in claim 1, wherein a center axis of the camera is also displaced by the correction angle.

* * * * *